United States Patent
Price et al.

(10) Patent No.: US 10,968,836 B2
(45) Date of Patent: Apr. 6, 2021

(54) METHOD FOR CONTROLLING FUEL DISTRIBUTION IN A GAS TURBINE ENGINE WITH MULTIPLE COMBUSTION ZONES

(71) Applicant: Siemens Aktiengesellschaft, Munich (DE)

(72) Inventors: Brian John Price, Baie-d'Urfe (CA); Michael Johnson, Montreal (CA); Charles Fallaha, Laval (CA); Jeremy Blackburn, ILC Perrot (CA); Louis Demers, Lachine (CA)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 159 days.

(21) Appl. No.: 16/315,721

(22) PCT Filed: Jul. 7, 2016

(86) PCT No.: PCT/US2016/041280
§ 371 (c)(1),
(2) Date: Jan. 7, 2019

(87) PCT Pub. No.: WO2018/009192
PCT Pub. Date: Jan. 11, 2018

(65) Prior Publication Data
US 2019/0234315 A1    Aug. 1, 2019

(51) Int. Cl.
*F02C 9/28* (2006.01)
*F02C 9/34* (2006.01)
*F02C 9/26* (2006.01)

(52) U.S. Cl.
CPC .............. *F02C 9/28* (2013.01); *F02C 9/26* (2013.01); *F02C 9/34* (2013.01)

(58) Field of Classification Search
CPC .. F23R 3/34; F23R 3/286; F23R 3/346; F02C 9/26; F02C 9/48; F02C 9/50; F02C 9/263; F02C 7/228
See application file for complete search history.

(56) References Cited

U.S. PATENT DOCUMENTS

| 5,469,700 A | * | 11/1995 | Corbett | F02C 9/28 60/39.281 |
| 7,162,875 B2 | * | 1/2007 | Fletcher | F23R 3/346 60/773 |
| 2015/0068191 A1 | * | 3/2015 | Panciroli | F02D 41/0087 60/273 |

FOREIGN PATENT DOCUMENTS

| CH | 649606 A5 | 5/1985 |
| CN | 104047726 A | 9/2014 |
| CN | 104421000 A | 3/2015 |
| CN | 103925084 A | 7/2015 |
| CN | 105339629 A | 2/2016 |

(Continued)

OTHER PUBLICATIONS

PCT International Search Report and Written Opinion dated Mar. 29, 2017 corresponding to PCT Application No. PCT/US2016/041280 filed Jul. 7, 2016.

*Primary Examiner* — William H Rodriguez
*Assistant Examiner* — David P. Olynick (57) ABSTRACT

A distribution method for a gas turbine engine distributes fuel based on a calculated ratio of air flow burnt to total air flow through all combustion zones in the gas turbine engine. This ratio is used to achieve a predetermined flame temperature in the gas turbine engine.

19 Claims, 5 Drawing Sheets

(56) References Cited

FOREIGN PATENT DOCUMENTS

EP 2357339 A1 8/2011
EP 2584176 A2 4/2013

* cited by examiner

METHOD FOR CONTROLLING FUEL DISTRIBUTION IN A GAS TURBINE ENGINE WITH MULTIPLE COMBUSTION ZONES

BACKGROUND

1. Field

Disclosed embodiments are generally related to gas turbine engines and, more particularly to distribution of fuel to multiple combustion zones of a gas turbine engine.

2. Description of the Related Art

A gas turbine engine typically has a compressor section, a combustion section having a number of combustors and a turbine section. Ambient air is compressed in the compressor section and conveyed to the combustors in the combustion section. The combustors combine the compressed air with a fuel and ignite the mixture creating combustion products. The combustion products flow in a turbulent manner and at a high velocity. The combustion products are routed to the turbine section via transition ducts. Within the turbine section are rows of vane assemblies. Rotating blade assemblies are coupled to a turbine rotor. As the combustion product expands through the turbine section, the combustion product causes the blade assemblies and turbine rotor to rotate. The turbine rotor may be linked to an electric generator and used to generate electricity.

During the operation of gas turbine engines the fuel distribution is scheduled to ensure operation of the combustor within defined temperatures. In addition to ensuring operation the combustor has to operate in order to control emissions. Further, in both land based and air based gas turbine engines rapid acceleration and deceleration may need to be accommodated. The fuel distribution has to be able to respond rapidly to avoid flameout and overheating of the combustor. Additionally, the gas turbine engines need to operate over a wide range of power levels in a variety of environmental conditions.

Therefore, there is a need to schedule fuel distribution around a combustor as accurately as possible so as to maintain operating temperatures to meet optimum emissions requirements. There is also a need to schedule the fuel distribution around the combustor sufficiently quickly to avoid flameout and combustor overheating.

SUMMARY

Briefly described, aspects of the present disclosure relate to distribution of fuel in a gas turbine engine.

An aspect of the present disclosure is a method for distributing fuel in a gas turbine engine comprising determining the ratio of air flow burnt to total air flow through all combustion zones in the gas turbine engine, wherein determining the ratio of air flow burnt through all combustion zones comprises establishing a total weighted sum of enthalpy per unit mass of combustion products, wherein establishing the total weighted sum of enthalpy per unit mass of combustion products comprises determining a primary weighted sum, wherein the primary weighted sum is an enthalpy per unit mass of combustion products at a primary combustion temperature in a primary combustion zone and determining a secondary weighted sum, wherein the secondary weighted sum is an enthalpy per unit mass of combustion products at a secondary combustion temperature in a secondary combustion zone; determining a transient fraction of the air flow to be burnt during a rapid transient condition, wherein determining the transient fraction uses a ratio of injector fuel flow and inlet pressure at a combustor; and distributing fuel in the gas turbine engine using the determined ratio of air flow burnt to total air flow through all combustion zones in the gas turbine engine to achieve a predetermined flame temperature.

Another aspect of the present disclosure is a gas turbine engine comprising: a controller configured to transmit fuel distribution signals within the gas turbine engine, wherein the controller determines the ratio of air flow burnt to total air flow through all combustion zones in the gas turbine engine, wherein determining the ratio of air flow burnt through all combustion zones comprises establishing a total weighted sum of enthalpy per unit mass of combustion products, wherein establishing the total weighted sum of enthalpy per unit mass of combustion products comprises determining a primary weighted sum, wherein the primary weighted sum is an enthalpy per unit mass of combustion products at a primary combustion temperature and determining a secondary weighted sum, wherein the secondary weighted sum is an enthalpy per unit mass of combustion products at a secondary combustion temperature; wherein the controller is further configured to determine a transient fraction of the air flow to be burnt during a rapid transient condition, wherein determining the transient fraction uses a ratio of injector fuel flow and inlet pressure at a combustor; and wherein the controller distributes fuel in the gas turbine engine using the determined ratio of air flow burnt to total air flow through all combustion zones in the gas turbine engine to achieve a predetermined flame temperature.

Still yet another aspect of the present disclosure is a method for distributing fuel in a gas turbine engine comprising: determining the ratio of air flow burnt to total air flow through all combustion zones in the gas turbine engine for a steady state condition, wherein determining the ratio of air flow burnt through all combustion zones comprises establishing a total weighted sum of enthalpy per unit mass of combustion products; determining a transient fraction of the air flow to be burnt during a rapid transient condition; and distributing fuel in the gas turbine engine using the determined ratio of air flow burnt to total air flow through all combustion zones in the gas turbine engine and the transient fraction of the air flow to be burnt so as to achieve a predetermined flame temperature.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Previous methods for controlling flame temperatures in gas turbine engines have required complicated referencing of tables and complex calculations. These calculations can be very configuration specific, require a lot of input parameters and other input data. The methods described herein are able to control the combustor flame temperatures by controlling fuel distribution in a simpler manner by using the underlying physical parameters of the gas turbine engine in order to adjust the fuel distribution to obtain the desirable performance of the gas turbine engine.

One of the advantages of the method for controlling fuel distribution described herein is that it is applicable to many configurations of gas turbine engines and only requires minor modifications to cope with a range of configurations. For the steady state operating conditions, many of the calculations for different configurations are similar. They are easily adaptable to different numbers of injector valves and different airflow splits. Generally the calculations are non-iterative and computationally efficient, thus not consuming computing time or lines of code. Also the calculations used do not require large amounts of input data.

The method for calculating the transient fuel distribution has the advantage that it is very responsive since its major input is that of total fuel demand and the other measurements can be made to be responsive. Further the method for integrating the steady state and transient methods has the advantage of de-coupling the two methods. Optimization of either the transient or steady state method can occur without significantly impacting the other.

An aspect of the proposed method involves determining the fuel distribution under steady state operating conditions and under transient conditions. It should be understood that the proposed method is implemented in controllers configured to direct and control the fuel distribution in the gas turbine engines based on the inputs and desired outputs. These inputs and outputs are also further ascertained based on the sensors located in the gas turbine engines. The proposed method is discussed herein and further discussed in terms of its implementations in various configurations for gas turbine engines.

The method for determining fuel distribution under steady state operating conditions will now be discussed. By "steady state operating conditions" it is meant that environmental conditions in which the gas turbine engine operates are reasonably the same and that the desired or predetermined output levels are the same. The steady state method is based on two enthalpy balances. The first enthalpy balance is taken from the exit of all the combustion zones. This includes those combustion zones not active and the cooling air that bypasses the combustor zones on its way to the entrance of the turbine.

The second enthalpy balance is from the entrance to the exit of each of the lit combustion zones. The second enthalpy balance is used to determine the fuel distribution through fuel metering valves (FMVs) to primary and second combustion stages.

The first enthalpy balance and the second enthalpy balance are expressed by the following two equations:

$$Wx = (h42*(1+FAR) - hWZ*FAR - h32)/(k2*(hWZ - h32)) \quad (1)$$

$$WFEQ = ((Wx - k1)/k1)*(hSZ - h32)/(hPZ - h32) \quad (2)$$

The first enthalpy balance is expressed by equation 1. This equation provides the energy of combustion. The energy of combustion is the energy at the combustor exit minus the energy at the combustor entry. The value Wx is the ratio of air flow that is burnt to the total air flow through all the combustor zones (total that could be burnt). The value h42 is the enthalpy per unit mass of air at turbine inlet temperature. The value FAR is the fuel air ratio at the turbine inlet. The value hWZ is the weighted sum of hPZ and hSZ enthalpy per unit mass, where hPZ is the enthalpy per unit mass of combustion products at a primary combustion temperature and hSZ is the enthalpy per unit mass of combustion products at a secondary combustion temperature. The value h32 is the enthalpy per unit mass of air at the combustion inlet temperature. The value k2 is the ratio of flow of combustion products, if all valves are open, to total turbine inlet flow, including all cooling air. The forgoing just applies in the special case when all valves are open. In the general case, the relationships for k1 and k2 are as set forth below.

The second enthalpy balance is expressed by equation 2. The value WFEQ is the ratio of secondary to primary fuel flow. This is the secondary airflow burnt times the secondary specific enthalpy over the primary airflow burnt times the primary specific enthalpy. The value of Wx is the ratio of air flow that is burnt to the total air flow through all the combustor zones (the total that could be burnt). The value k1 is the ratio of air flow through the primary zone to air flow through all combustion zones, such as the primary zone, secondary zone, etc.

Equations 1 and 2 are used to determine the fuel distribution needs for the desired, or predetermined, flame specific enthalpies. The implementation of the first enthalpy balance and the second enthalpy balance are applied to various configurations for gas turbine engines. Some of these configurations are discussed below and then the first enthalpy balance and the second enthalpy balance are applied to each of the configurations for the steady state condition.

Figure 1:
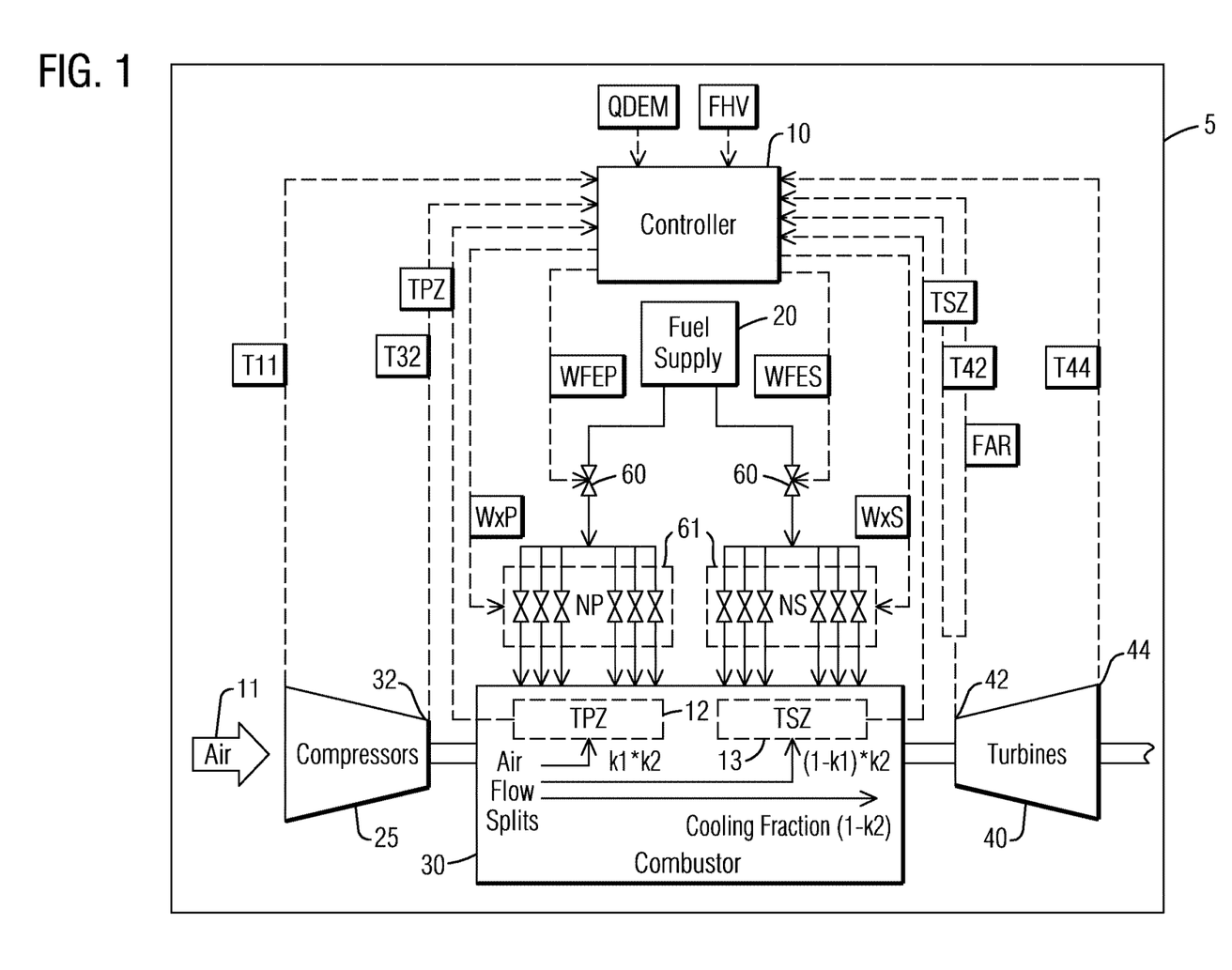
FIG. 1 is a schematic of a configuration of a gas turbine engine.

Using equations 1 and 2, these equations can be used to distribute the fuel in the configuration shown in FIG. 1 in order to obtain predetermined, desired results. In using equations 1 and 2 the weighted enthalpy, hWZ is calculated. It should be understood that in discussing the configuration shown in FIG. 1, there are two combustion zones. In some embodiments more or less combustions zones may exist. In these embodiments the weighted enthalpy hWZ is determined based on the configuration. Some of these configurations are discussed further below.

FIG. 1 shows schematically a possible configuration of a gas turbine engine 5. The gas turbine engine 5 has a controller 10, a fuel supply 20, a compressor 25, combustor 30, turbines 40, fuel metering valves (FMV) 60 and valves 61. In the schematic the variables used in the equations are indicated in the schematic diagram.

The configuration of the gas turbine engine 5 shown in FIG. 1 has one or more compressors 25 connected to combustors 30 via combustor inlets 32. The combustors 30 are further connected to the turbines 40 via turbine inlets 42. Ambient air 11 is compressed in the compressors 25 and conveyed to the combustors 30. The combustors 30 combine the compressed air with fuel from the fuel supply 20, which is distributed via the FMVs 60 and valves 61 and ignites the mixture creating combustion products. Valves 61 control flow to circumferential injectors (not shown in the diagrams). The combustion products flow in a turbulent manner and at a high velocity to the turbines 40. As the combustion product expands through the turbines 40, the combustion product causes blade assemblies and turbine rotors to rotate. The turbine rotor may be linked to an electric generator and used to generate electricity. The flow of combustion products exits through the turbine exit 44.

Temperatures found within the gas turbine engine 5 that occur during its operation are measured by sensors and generate signals that are sent to the controller 10. These signals are then used by the controller 10 to generate output signals that are sent to the FMVs 60 and valves 61 in order to control fuel distribution. FMVs 60 and valves 61 are axial and circumferential fuel valves that are used to control the fuel flow to more than one combustion zones.

In the embodiment shown in FIG. 1 there are two axial combustor zones, a primary combustion zone 12 and a secondary combustion zone 13 which are supplied fuel via the fuel supply 20 and FMVs 60. The primary combustion zone 12 and secondary combustion zone 13 have a number of circumferential fuel injectors controlled by the valves 61. The airflow that enters combustor 30 from the compressor 25 is split such that the fraction k2 enters the primary combustion zone 12 and the second combustion zone 13, the fraction 1−k2 is used for cooling. The ratio of the flow through the primary zone 12 and the secondary combustion zone 13 is k1. The fractions of the total entering primary zone 12 is k1*k2 and the second zone 13 is (1−k1)*k2.

In order to implement equations 1 and 2 discussed above various inputs are provided to the controller 10. QDEM is the total fuel flow energy demand and the FHV is the total fuel heating value. The QDEM is determined in the controller 10 by an algorithm, which adjusts QDEM to achieve the desired power or shaft speed. In determining fuel distribution it is an inputted value. The FHV is input directly as a constant into the controller 10 as a single value, or the fuel percentage constituents can be input directly as constants, or the fuel constituents can be measured using a gas chromatograph. Where fuel constituents are an input, then an algorithm in the controller 10 calculates the FHV from the constituents. In determining fuel distribution it is an inputted value.

Additional inputs to the controller 10 are the predetermine temperatures for the primary zone 12 and the secondary zone 13. These are represented by the variables TPZ and TSZ. Measured temperatures are taken of the ambient air 11 at the inlet to the gas turbine engine 5 at the compressor 25 in order to give the temperature T11 and at the turbine outlet 44 to give the temperature T44. These values can also be inputted to the controller 10. Measured or calculated temperatures can also be determined at the combustor inlet 32 and the turbine inlet 42 to give the temperature values T32 and T42 respectively. Furthermore, the measured or calculated fuel air ratio (FAR) can be determined at the turbine inlet 42. These values can also be provided to the controller 10.

The controller 10 uses the provided values to output fuel flow demand for the FMVs 60, which control the fuel flow distributed to the primary zone 12 and the secondary zone 13, represented by the variables WFES for primary fuel flow and WFES for secondary fuel flow. Also outputted by the controller 10 are the number of circumferential valves 61 that are to be opened so that fuel is injected via injectors to the primary zone 12 and the secondary zone 13, represented by the variables WxP for the primary zone 12 and WxS for the secondary zone 13.

In the configuration shown in FIG. 1, the weighted enthalpy hWZ is equal to hPZ, if Wx is less than or equal to k1, which occurs if no valves 61 are open in the secondary zone 13. Additionally, the weighted enthalpy hWZ is equal to (hPZ*k1+hSZ*(Wx−k1))/Wx if Wx is greater than k1, which occurs if some of the FMVs 60 are open in the secondary zone 13. Depending on whether or not the secondary zone 13 is active will determine which of the two aforementioned equations are used in order to determine the weighted enthalpy hWZ. It should be noted that equation 1 and the equation hWZ=(hPZ*k1+hSZ*(Wx−k1)/Wx if Wx is greater than k1 requires iteration to calculate.

Figure 2:
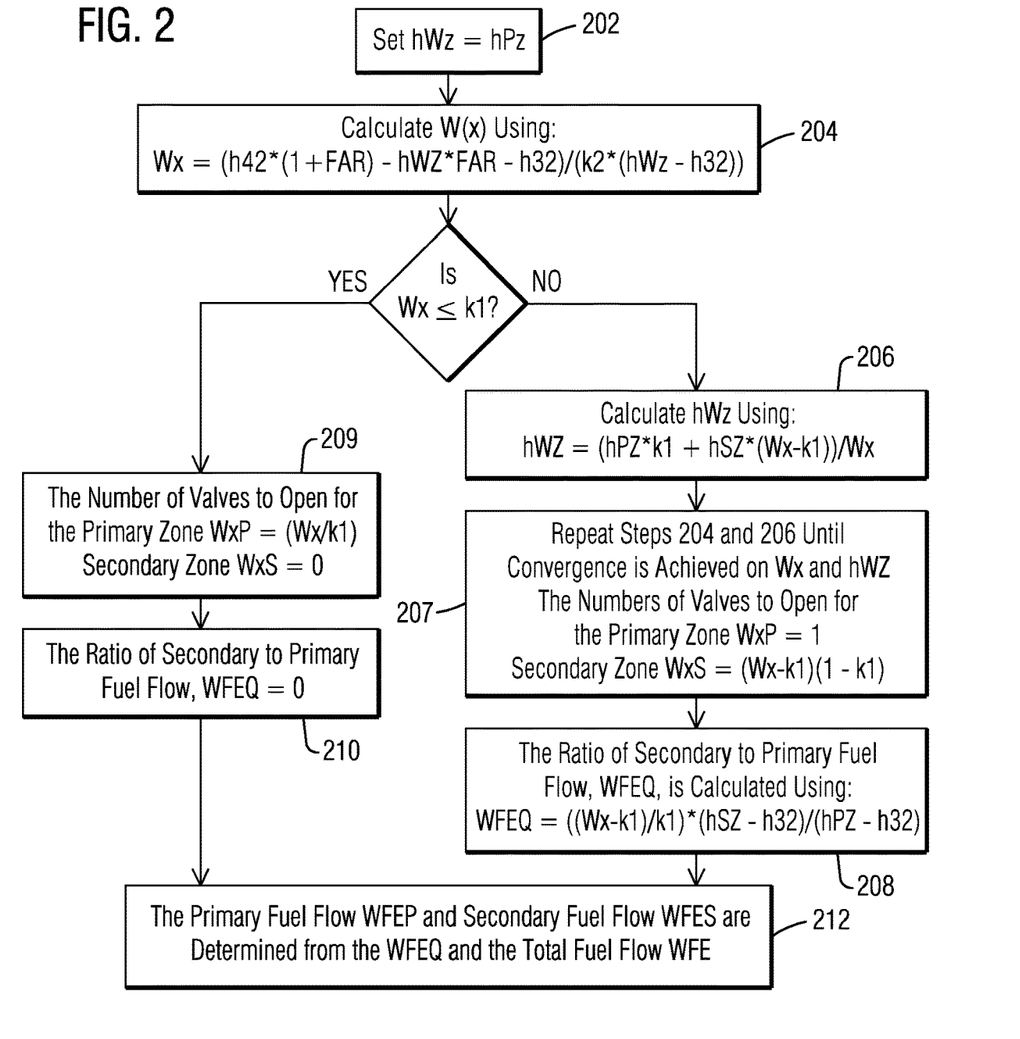
FIG. 2 is a flow chart showing a method of calculating fuel distribution during a steady state condition.

To determine the fuel distribution in the configuration shown in FIG. 1, reference is made to FIG. 2 which shows the flow of calculations performed by the controller 10 in determining the fuel distribution in the gas turbine engine 5. In step 202, the weighted enthalpy hWZ is set equal to the enthalpy for the primary zone 12, i.e. hPZ. In step 204, the ratio of air flow that is burnt to the total air flow through all the combustion zones, Wx, is determined. If Wx is less than or equal to k1, the controller 10 moves through steps 209 and 210, otherwise the controller 10 moves through steps 206, 207 and 208.

With Wx less than or equal to k1, in step 209, the number of FMVs 60 to open for the primary zone 12 and secondary zone 13 are WxP=(Wx/k1) and WxS=0. In step 210, the ratio of secondary to primary fuel flow, WFEQ, is set to zero.

With Wx greater than k1, in step 206, the weighted enthalpy hWZ is calculated using hWZ=(hPZ*k1+hSZ*(Wx−k1))/Wx. In step 207, steps 204 and 206 are repeated until convergence is achieved between Wx and hWZ. The number of FMVs 60 to open for the primary zone 12 and the secondary zone 13 are WxP=1 and WxS=(Wx−k1)/(1−k1). In step 208, the ratio of secondary to primary fuel flow, WFEQ, is calculated using WFEQ=((Wx−k1)/k1)*(hSZ−h32)/(hPZ−h32).

In step 212, the primary fuel flow WFEP and secondary fuel flow WFES are determined from the WFEQ and the total fuel flow WFE, which is obtained by WFE=QDEM/FHV. This results in WFEP=WFE/(1+WFEQ) and WFES=WFE−WFEP. These results are used to determine the distribution of the fuel supply through the two FMVs 60 shown, where there is one FMV 60 for each of the combustion zones, i.e. the primary zone 12 and the secondary zone 13.

Figure 3:
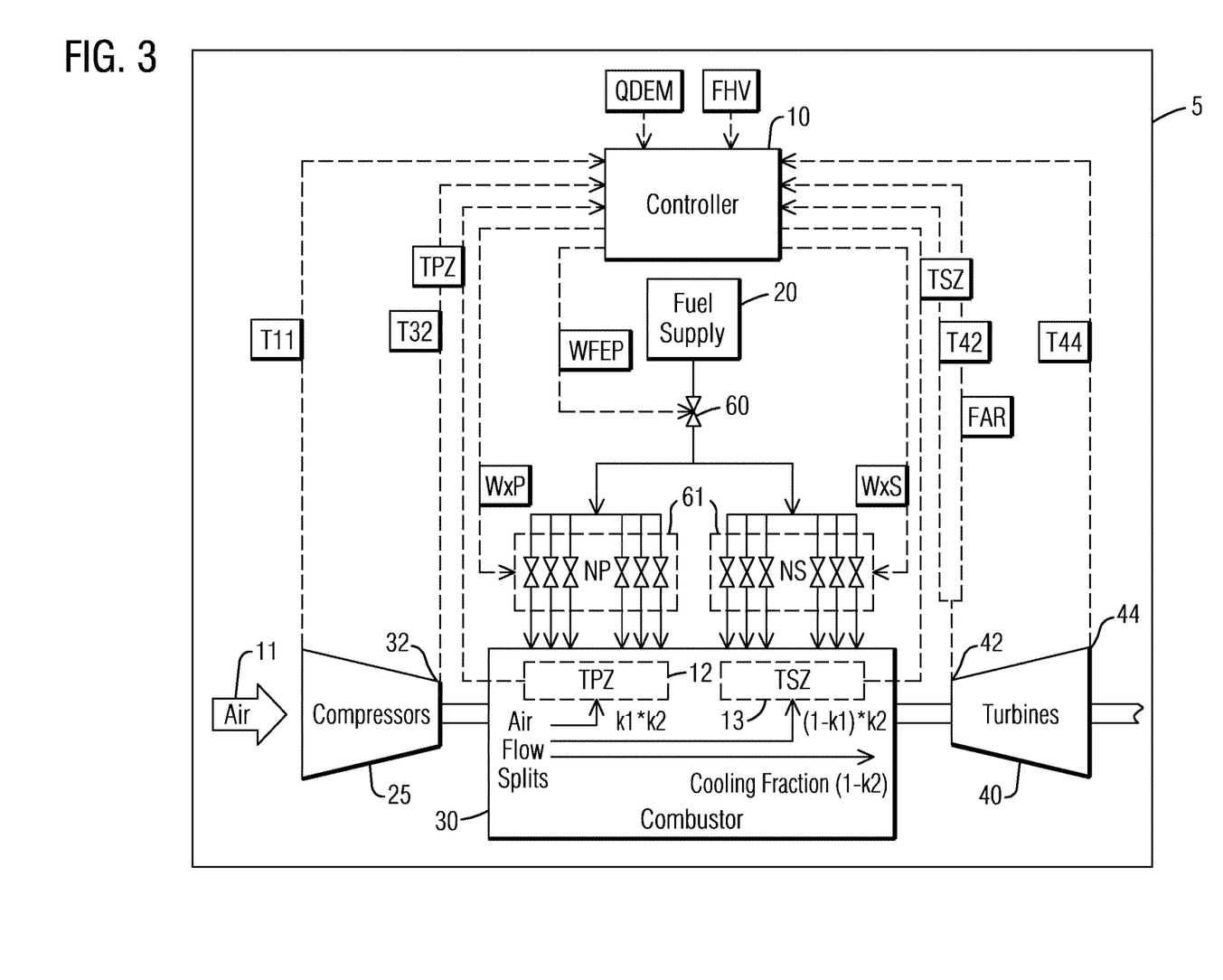
FIG. 3 is another schematic of a different configuration of a gas turbine engine.

FIG. 3 shows another possible configuration for the gas turbine engine 5. The main difference between the configuration shown in FIG. 3 and the configuration shown in FIG. 1 is that the configuration shown in FIG. 3 only has one FMV 60 to control the fuel flow to both the primary zone 12 and the secondary zone 13. The single FMV 60 schedules the fuel distribution to both the primary zone 12 and the secondary zone 13. The calculations performed for the configuration shown in FIG. 3 differs from those of the configuration shown in FIG. 1 in that steps 210 and 212 are not performed since there is no secondary and primary fuel flow as there is only a single fuel flow to both the primary combustion zone 11 and the secondary combustion zone 12 via the valves 61.

Figure 4:
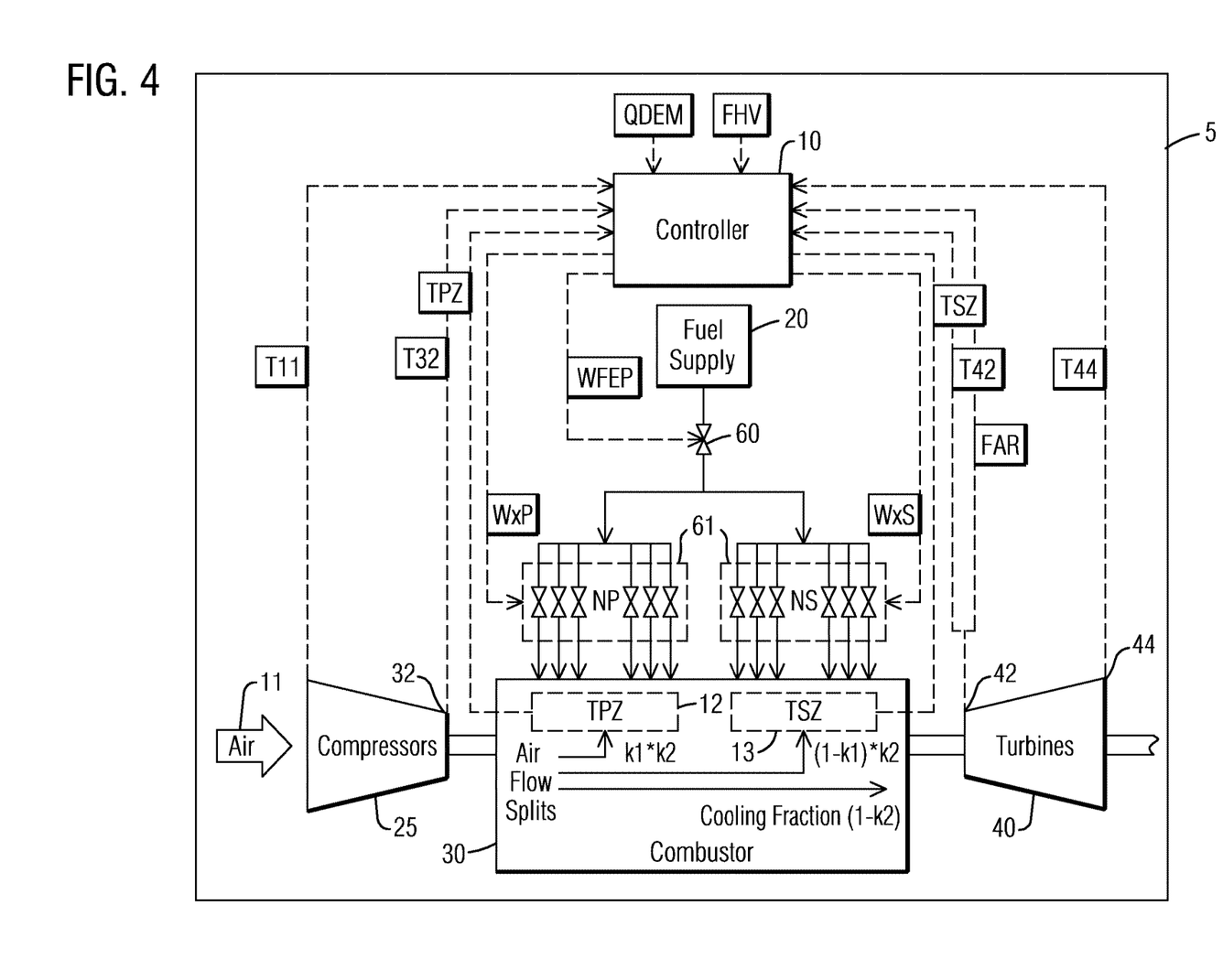
FIG. 4 is another schematic of a different configuration of a gas turbine engine

FIG. 4 shows another configuration of the gas turbine engine 5 that differs from the configurations shown in FIGS. 1 and 3. In this configuration, the components are the same except that there is an additional simplification in that the desired primary and secondary flame temperatures are the same (TPZ=TSZ), and are now both labelled as TPZ. Also, similar to the configuration shown in FIG. 3, there is only one FMV 60.

In determining the fuel flow for the configuration shown in FIG. 4, hWZ in equation 1, can be replaced with hPZ, since the temperatures are equal. This results in the modified equation of Wx=(h42*(1+FAR)−(hPZ*FAR−h32)/(k2*(hPZ−h32)). If Wx≤k1, then the numbers of valves 61 to open for the primary zone 12 and the secondary zone 13 are WxP=(Wx/k1) and WxS=0. If Wx is greater than k1, then the numbers of valves 60 to open for the primary zone 12 and the secondary zone 13 are WxP=1 and WxS=(Wx−k1)/(1−k1).

Figure 5:
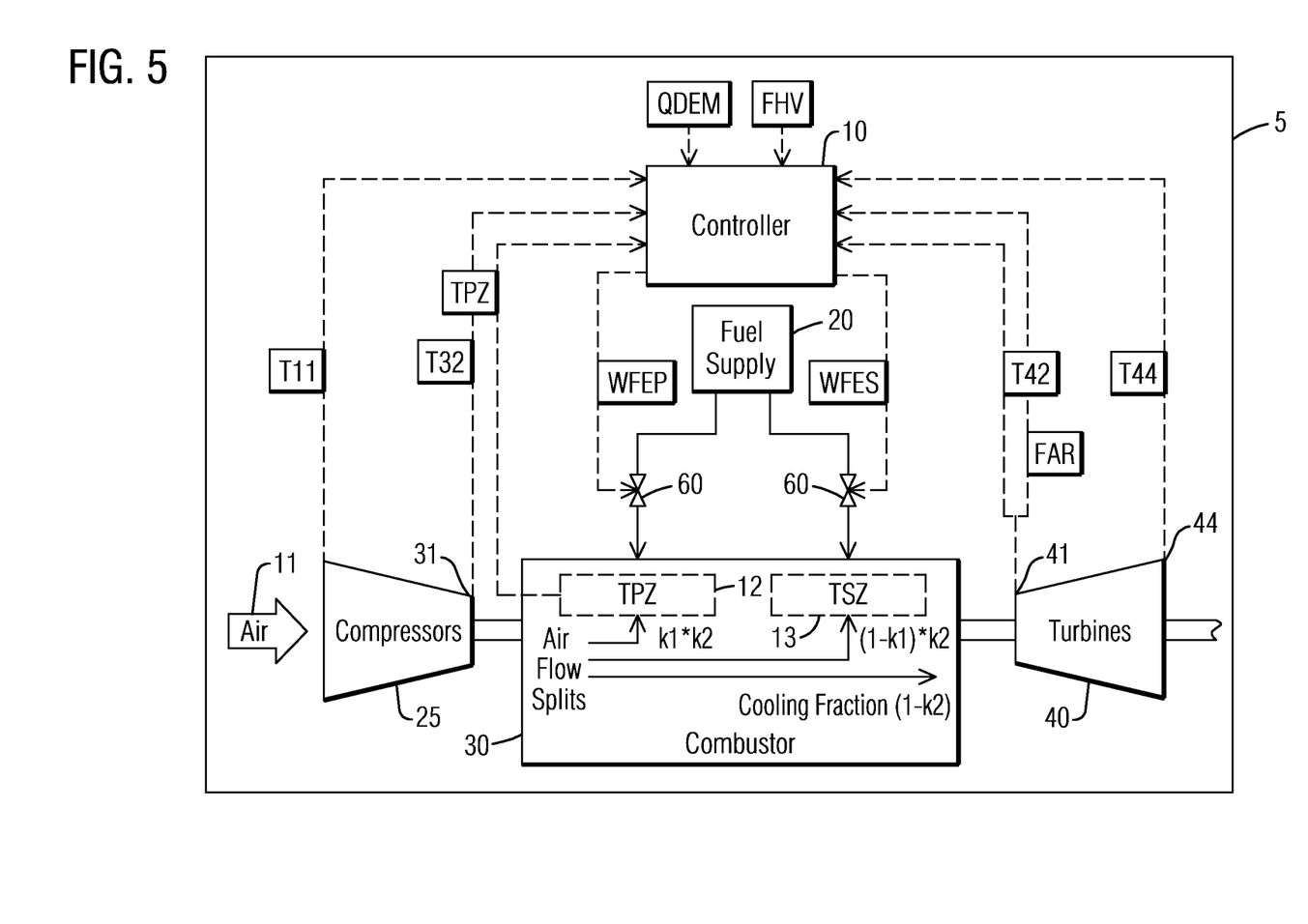
FIG. 5 is another schematic of a different configuration of a gas turbine engine.

FIG. 5 shows another configuration of a gas turbine engine 5 that is different from the configuration shown in FIGS. 1, 3 and 4. The configuration shown in FIG. 5 has two FMVs 60 that control flow to the primary zone 12 and the secondary zone 13. However, in contrast to the other configurations, valves 61 are removed, or alternatively are all in an open position. With this configuration it is only possible to control the flame temperature of the primary zone 12. This results in a simplification of the calculations that are performed. This configuration uses the equation Wx=(h42*(1+FAR)−(hPZ*FAR−h32)/(k2*(hPZ−h32) and then the results of this to calculate the ratio of secondary fuel to primary fuel using WFEQ=(Wx−k1)/k1.

Wx, the ratio of air flow that is burnt to the total air flow through all the combustion zones is a real continuous number. If the number of valves 61 associated with the injectors are on/off and not fully modulating then this real number needs to be converted into an integer number of on/off valves to be opened. The signals for controlling the FMVs 60 and valves 61 are transmitted by the controller 10. Typically the secondary injectors will only be opened if all the primary injectors are already open. Therefore the following set of equations will determine how many valves 61 for the primary zone 12 and the secondary zone 13 to open. If Wx<k1 then round Wx*NP to nearest whole number of on/off valves 61 for the primary zone 12, where NP is the number of valves 61 for the primary zone 12. If Wx>k1 then open all valves 61 for the primary zone 12, then round (Wx−k1)*NS to the nearest whole number of on/off valves for the secondary zone 13. Preferably a hysteresis loop is used to limit excessive toggling of valves 61.

While the above methods for establishing the transmittal of signals to control flame temperature, and therefore emissions, are sufficient for steady state operating conditions, they do not address calculating fuel distribution under rapid transient conditions. This occurs when the total fuel flow is changing rapidly. By rapidly it is meant changing the gas turbine power at a rate equivalent to accelerating or decelerating between 0 power and full power in 1 minute or less. In terms of fuel flow this corresponds to a threshold rate of 0.5% per second. This is because one of the parameters used in the steady state operating conditions is turbine exit temperature T44, which responds much slower than the changing total fuel flow due to the response characteristics of the gas turbine engine 5 and lags in measurement.

During rapid transient conditions a different controlling parameter is required. The parameter selected needs to correlate to the flame temperature and respond quickly. QP32 is the ratio of injector fuel flow Q and the pressure at the combustor inlet 32. This is correlated with the fuel air ratio. The fuel air ratio is correlated with the combustion temperature rise. The goal is to maintain a constant combustion flame temperature. The flame temperature is equal to the temperature at the combustor inlet 32 plus the temperature rise. The combustor inlet temperature T32 has an associated measurement lag which makes it unresponsive during transient manoeuvres. However, it is well correlated with the speed of compressor 25, which is a responsive measurement and is used as the base parameter herein.

A schedule of QP32 is created as a function of the speed of the compressor. The transient fraction of airflow to be burnt, represented by WxTR, is (QDEM/P32)/QP32, where QDEM is the demanded total fuel flow.

The calculation of WxTR is carried out at all times, as is the steady state calculation of Wx. These two calculations are integrated to obtain a final value. This algorithm is graphically illustrated in FIG. 6. The output is the transient schedule with a bias applied to it. This bias is equal to the difference between outputs of the steady state and transient schedules; however, the speed at which it can change is rate limited. During steady state operation or during a slow transient stage, the algorithm represented by FIG. 6 biases the output of the transient schedule to equal that of the steady state operating schedule. The rate limit of the bias is set to permit this. Under these circumstances the net results indistinguishable from simply following the steady state schedule Wx. During a rapid transient, however, the rate limit on the bias is such that it remains nearly constant and the final schedule closely follows WxTR.

Figure 6:
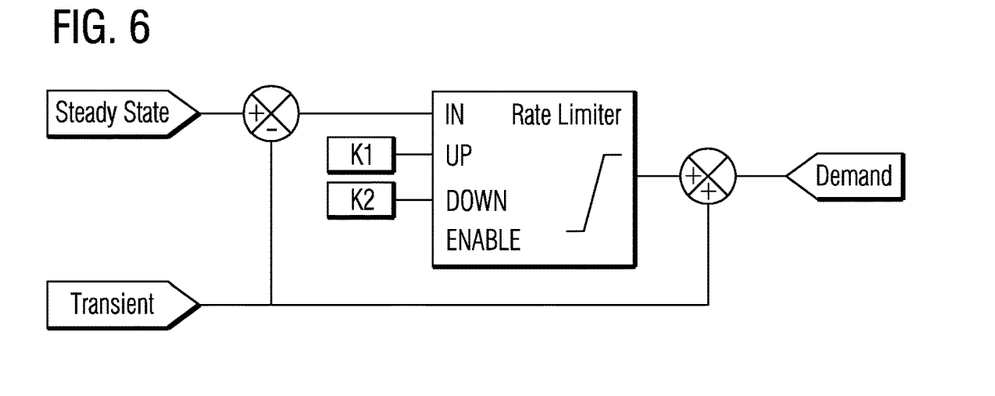
FIG. 6 is a diagram of an algorithm depicting the interaction between the steady state method and the rapid transient method.

The steady state schedule shown in FIG. 6 is a flow fraction between 0 and 1. The transient schedule is also a flow fraction between 0 and 1. 0 represents all of the valves 61 for the injectors being closed and 1 represents all of the valves 61 for the injectors being open. The difference is a flow fraction between 0 and 1. In the embodiment shown, the chosen rate limit on the difference is 0.005 per second. However, it should be understood that the rate limit can be changed and may vary between 0.001 to 0.05 per second. 0.005 per second represents about 1% power per second, since the flow fraction at 0 and at full power are approximately 0.5 and 1 respectively.

A change in power level will cause both the steady state and the transient flow fractions to change. Because the steady state schedule is affected by measurement lags and the transient schedule is not, then the faster the change in power and flow fraction the faster the 2 schedules will diverge. Provided below are two examples.

In the first example, if the power change rate is such that the two schedules diverge at less than or equal to 0.005 flow fractions per second then this is below the trim rate. The result will be that the final flow fraction demand is the same as the steady state flow fraction. At this rate it is judged that the measurement lags in the steady state schedule are sufficiently small so as not to cause a problem.

In the second example, if the power change rate is fast and the transient schedule goes from 1 to 0.2 in 0.5 seconds then the steady state operating schedule will have hardly moved. This is because of the measurement lags and so they will diverge at (1−0.2)/0.5=1.6 per second. In this situation after 0.5 seconds the trim will be limited to 0.005*0.5=0.0025 and so the final demand will be equal to the transient operating schedule plus the trim. So 0.2+0.0025−0.2025. The effect will be that the final schedule will largely follow the transient schedule.

Both the steady state operating conditions and the transient operating conditions are used in order to control the fuel distribution in the gas turbine engine 5. By using both conditions and the aforementioned factors discussed in reference to the configurations shown in FIGS. 1 and 3-5 one is able to distribute the fuel so as to maintain a steady flame temperature for the combustor 30. By maintaining a steady flame temperature optimum emissions requirements can be met. Additionally the fuel distribution around the combustor 30 is able to be performed sufficiently quickly to avoid flameout and avoid overheating of the combustor 30. Performing the transient operation calculations permits maintaining the predetermined flame temperature of the combustor 30 over a wide range of environmental conditions and changing conditions. Also, the method described herein permits performance and adaptability for a number of configurations with ease.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for distributing fuel in a gas turbine engine comprising:
    determining a ratio of air flow burnt to total air flow through all combustion zones in the gas turbine engine,
    wherein determining the ratio of air flow burnt through all combustion zones comprises establishing a total weighted sum of enthalpy per unit mass of combustion products,
    wherein establishing the total weighted sum of enthalpy per unit mass of combustion products comprises determining a primary weighted sum and a secondary weighted sum,
    wherein the primary weighted sum is an enthalpy per unit mass of combustion products at a primary combustion temperature in a primary combustion zone,
    wherein the secondary weighted sum is an enthalpy per unit mass of combustion products at a secondary combustion temperature in a secondary combustion zone;
    determining a transient fraction of the air flow to be burnt during a rapid transient condition,
    wherein determining the transient fraction uses a ratio of injector fuel flow and inlet pressure at a combustor; and
    distributing fuel in the gas turbine engine using the determined ratio of air flow burnt to total air flow through all combustion zones in the gas turbine engine to achieve a predetermined flame temperature.

2. The method of claim 1, further comprising; determining a ratio of a secondary fuel flow to a primary fuel flow in the gas turbine engine using the ratio of air flow burnt to total air flow through all combustion zones in the gas turbine engine.

3. The method of claim 1, further comprising; determining a total fuel flow in the gas turbine engine.

4. The method of claim 1, further comprising; determining a secondary fuel flow and a primary fuel flow from a ratio of secondary fuel flow to primary fuel flow in the gas turbine engine and a total fuel flow in the gas turbine engine.

5. The method of claim 1, wherein determining the ratio of air flow burnt to total air flow through all combustion zones in the gas turbine engine further comprises determining enthalpy per unit mass of air at a turbine inlet temperature.

6. The method of claim 1, wherein determining the ratio of air flow burnt to total air flow through all combustion zones in the gas turbine engine further comprises determining enthalpy per unit mass of air at a combustion inlet temperature.

7. The method of claim 1, wherein determining the ratio of air flow burnt to total air flow through all combustion zones in the gas turbine engine further comprises determining a fuel air ratio at a turbine inlet.

8. The method of claim 1, wherein determining the ratio of air flow burnt to total air flow through all combustion zones in the gas turbine engine further comprises determining a ratio of flow of combustion products to total turbine inlet flow.

9. The method of claim 1, wherein the total weighted sum of enthalpy per unit mass of combustion products is equal to the primary weighted sum.

10. A gas turbine engine comprising:
    a controller (10) configured to transmit fuel distribution signals within the gas turbine engine (10),
    wherein the controller determines ratio of air flow burnt to total air flow through all combustion zones in the gas turbine engine,
    wherein determining the ratio of air flow burnt through all combustion zones comprises establishing a total weighted sum of enthalpy per unit mass of combustion products,
    wherein establishing the total weighted sum of enthalpy per unit mass of combustion products comprises determining a primary weighted sum and a secondary weighted sum,
    wherein the primary weighted sum is an enthalpy per unit mass of combustion products at a primary combustion temperature,
    wherein the secondary weighted sum is an enthalpy per unit mass of combustion products at a secondary combustion temperature;
    wherein the controller is further configured to determine a transient fraction of the air flow to be burnt during a rapid transient condition,
    wherein determining the transient fraction uses a ratio of injector fuel flow and inlet pressure at a combustor; and
    wherein the controller distributes fuel in the gas turbine engine using the determined ratio of air flow burnt to total air flow through all combustion zones in the gas turbine engine to achieve a predetermined flame temperature.

11. The gas turbine engine of claim 10, wherein the controller configured to determine a ratio of a secondary fuel flow to a primary fuel flow in the gas turbine engine using the ratio of air flow burnt to total air flow through all combustion zones in the gas turbine engine.

12. The gas turbine engine of claim 10, wherein the controller is configured to determine a total fuel flow in the gas turbine engine.

13. The gas turbine engine of claim 10, wherein the controller is configured to determine a secondary fuel flow and a primary fuel flow from a ratio of secondary fuel flow to primary fuel flow in the gas turbine engine and a total fuel flow in the gas turbine engine.

14. The gas turbine engine of claim 10, wherein the controller is configured so that determining the ratio of air flow burnt to total air flow through all combustion zones in the gas turbine engine further comprises determining enthalpy per unit mass of air at a turbine inlet temperature.

15. The gas turbine engine of claim 10, wherein the controller is configured so that determining the ratio of air flow burnt to total air flow through all combustion zones in the gas turbine engine further comprises determining enthalpy per unit mass of air at a combustion inlet temperature.

16. The gas turbine engine of claim 10, wherein the controller is configured so that determining the ratio of air flow burnt to total air flow through all combustion zones in the gas turbine engine further comprises determining a fuel air ratio at a turbine inlet.

17. The gas turbine engine of claim 10, wherein the controller is configured so that determining a ratio of air flow burnt to total air flow through all combustion zones in the gas turbine engine further comprises determining a ratio of a flow of combustion products to total turbine inlet flow.

18. The gas turbine engine of claim 10, wherein the total weighted sum of enthalpy per unit mass of combustion products is equal to the primary weighted sum.

19. A method for distributing fuel in a gas turbine engine comprising:
   determining a ratio of air flow burnt to total air flow through all combustion zones in the gas turbine engine for a steady state condition,
   wherein determining the ratio of air flow burnt through all combustion zones comprises establishing a total weighted sum of enthalpy per unit mass of combustion products;
   determining a transient fraction of the air flow to be burnt during a rapid transient condition; and
   distributing fuel in the gas turbine engine using the determined ratio of air flow burnt to total air flow through all combustion zones in the gas turbine engine and the transient fraction of the air flow to be burnt so as to achieve a predetermined flame temperature.

* * * * *